(12) United States Patent
Priyadarsini et al.

(10) Patent No.: US 11,687,069 B2
(45) Date of Patent: Jun. 27, 2023

(54) IDENTIFICATION OF FACILITY STATE AND OPERATING MODE IN A PARTICULAR EVENT CONTEXT

(71) Applicant: Honeywell International Inc., Morris Plains, NJ (US)

(72) Inventors: Prangya Priyadarsini, Bangalore (IN); Suresh Thombare, Hingoli (IN); Viraj Srivastava, New Delhi (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 80 days.

(21) Appl. No.: 17/241,615

(22) Filed: Apr. 27, 2021

(65) Prior Publication Data
US 2021/0382470 A1 Dec. 9, 2021

(30) Foreign Application Priority Data

May 29, 2020 (IN) .............................. 202041022669

(51) Int. Cl.
| | |
|---|---|
| *G05B 23/02* | (2006.01) |
| *G06N 20/00* | (2019.01) |
| *H04L 41/14* | (2022.01) |
| *H04L 43/04* | (2022.01) |
| *H04L 43/0805* | (2022.01) |

(52) U.S. Cl.
CPC ..... *G05B 23/0281* (2013.01); *G05B 23/0272* (2013.01); *G05B 23/0283* (2013.01); *G05B 23/0294* (2013.01); *G06N 20/00* (2019.01); *H04L 41/14* (2013.01); *H04L 43/04* (2013.01); *H04L 43/0805* (2013.01)

(58) Field of Classification Search
CPC ............ G05B 23/0272; G05B 23/0267; G05B 23/0281; G05B 23/0283; G06Q 10/06393
See application file for complete search history.

(56) References Cited

U.S. PATENT DOCUMENTS

| | | | |
|---|---|---|---|
| 2013/0173218 A1* | 7/2013 | Maeda ............... | G05B 23/0224 702/182 |
| 2014/0114611 A1* | 4/2014 | Moyne ............... | G05B 23/0272 702/183 |
| 2016/0328654 A1* | 11/2016 | Bauer .................. | G06K 9/6267 |
| 2017/0248038 A1* | 8/2017 | Ramadhan ............. | F01K 13/02 |
| 2017/0357928 A1* | 12/2017 | Ross ........................ | G09B 5/06 |

FOREIGN PATENT DOCUMENTS

CN 113762586 12/2021

OTHER PUBLICATIONS

"European Application Serial No. 21173110.4, Extended European Search Report dated Feb. 4, 2022", 7 pgs.

* cited by examiner

*Primary Examiner* — Manuel L Barbee
(74) *Attorney, Agent, or Firm* — Alston & Bird LLP

(57) ABSTRACT

A system processes historical facility data that relate to facility states and modes of operation. The historical facility data are clustered into groups representing the facility states and the modes of operation. The groups are used to determine a current state and mode of the facility. When the facility is in a normal state, the system determines whether an event in the facility is an abnormality. If an abnormality is identified, the system transmits a signal indicating the abnormality.

18 Claims, 11 Drawing Sheets

| | 1. EVENTS DATA | 2. CONFIGURATION DATA | 3. GRAPHICS DATA | 4. PROCESS HISTORIAN DATA | 5. OPERATOR LOGS |
|---|---|---|---|---|---|
| DATA (313) | 1. PROCESS ALARMS<br>2. ALARM PRIORITY<br>3. PROCESS CHANGES<br>4. PROCESS MESSAGE<br>5. SYSTEM ALARMS<br>6. TIME STAMP | PROCESS TAG<br>1. INPUT CONNECTION<br>2. OUTPUT CONNECTION<br>3. ALGORITHM TYPE<br>4. DESCRIPTION<br>5. ASSET (GROUPING)<br>6. PARAMETER NAME<br>7. PARAMETER DATA TYPE<br>8. PARAMETER VALUE | PROCESS TAG<br>1. SECONDARY PROCESS TAG<br>2. UPSTREAM / DOWNSTREAM<br>3. PROCESS CONNECTION / CONTROL<br>4. DEVICE TYPE<br>5. GRAPHIC OBJECT TYPE<br>6. EMERGENCY SHUTDOWN TOOL TAGS (ESD) | PROCESS TAG<br>1. CONFIGURATION OF SAMPLING INTERVAL<br>2. HISTORY PROCESS VARIABLE (PV) / OPERATIONAL PARAMETERS (OP) DATA | 1. FIELD LOG BOOKS<br>2. INCIDENT REPORTS<br>3. OFFLINE ANALYSIS LOGS |
| INFORMATION EXTRACTED FROM DATA ABOVE (322) | 1. ROTATING EQUIPMENT STATUS EVENTS<br>2. ESD SAFETY VALVE STATUS EVENTS<br>3. MAINTENANCE OVERRIDE SWITCH EVENTS<br>4. RED TAG EVENTS<br>5. IDENTIFY THE CONTROLLER MODE STATUS (E.G. FLOW CONTROLLER MANUAL / AUTO)<br>6. FLOODING OF ALARM EVENTS | 1. FLOW TAG DETAILS RELATED TO A PARTICULAR ASSET<br>2. CONTROL RELATIONSHIPS<br>3. OPERATING LIMITS FOR MODEL PARAMETERS, E.G. ALARM LIMITS (PVLO, PVHI) CONTROLLER SP AND OP LIMITS<br>4. ASSET GROUPING<br>5. DISTINGUISH ROTATING AND NON-ROTATING TAGS USING BLOCKS (E.G. DEVCTRL) | 1. INTERDEPENDENT, INDEPENDENT AND DEPENDENT SEQUENCES OF VARIABLES FOR EACH MODEL (REPRESENTING A SUBSYSTEM)<br>2. OBTAIN THIRD PARTY TAG (E.G. ESD TAGS) DETAILS FROM GRAPHICS<br>3. TO GET CONTROLLER DETAILS (E.G. TO CONFIRM DCS CONTROL TAGS)<br>4. UNIT SPECIFIC FLOW TAGS DETAILS | 1. PV DATA TO ANALYZE THE TRENDS TO DETECT PLANT STATE AND MODE<br>2. TO GET STEADY STATE VALUES FOR PV AND OP TAGS REQUIRED FOR PLANT STATE AND MODE IDENTIFICATIONS<br>3. TO GET THE DETAILS OF OP PARAMETERS TO CONFIRM PLANT STATE (E.G. IF OP IS ZERO, THE UNIT IS IN SHUTDOWN) | 1. OPERATIONAL CONSTRAINT DETAILS THAT ARE NOT VISIBLE IN THE PROCESS HISTORIAN DATA (E.G. LEAKAGE FROM A PIPELINE) |
| USE OF THE INFORMATION EXTRACTED (332) | ENABLES IDENTIFICATION OF PROCESS / SYSTEM EVENTS RELATED TO PLANT STATE IDENTIFICATION - STARTUP, SHUTDOWN, MAINTENANCE AND NORMAL OPERATION MODES | ENABLES IDENTIFICATION OF KPI TAGS REQUIRED FOR PLANT STATE IDENTIFICATION AND EVENT CONTEXT IDENTIFICATION | ENABLES CONFIRMATION OF KPI TAGS (E.G. UNIT PERFORMANCE MONITORING) FROM CONFIGURATION DATA REQUIRED FOR PLANT STATE IDENTIFICATION AND EVENT CONTEXT IDENTIFICATION | ENABLES ANALYSIS OF PATTERNS IN PV DATA REQUIRED FOR PLANT STATE IDENTIFICATION AND EVENT CONTEXT IDENTIFICATION | ENABLES OPERATIONAL CONSTRAINTS TO BE EXTRACTED AND UTILIZED TO CONFIRM PLANT STATE AND EVENT CONTEXT |

FIG. 3

| | SHUTDOWN STATE 410 | | STARTUP STATE 430 | | NORMAL OPERATING STATE 450 | MAINTENANCE STATE 460 |
|---|---|---|---|---|---|---|
| | NORMAL SHUTDOWN 411 | EMERGENCY SHUTDOWN 420 | COLD STARTUP | HOT STARTUP 440 | | |
| FLOW TAGS | DECREASING AND TRENDING TO BELOW PVLO LIMIT WITH RAMP DOWN OF FEED FLOWS | SUDDEN FLOW PARAMETER TRENDING TO PVLO LIMIT WITHOUT ANY RAMPUP | INCREASING AND TRENDING TO STEADY STATE VALUES | | AT STEADY STATE VALUES | DECREASING AND TRENDING TO BELOW PVLO LIMIT |
| ROTATING EQUIPMENT STATUS 412 | STOPPED SEQUENTIALLY | SEQUENCE NOT FOLLOWED WHEN STOPPING | STARTED | | STARTED | STARTED |
| SAFETY VALUE STATUS (ESD ON / OFF VALUES) | CLOSED SEQUENTIALLY | SEQUENCE NOT FOLLOWED WHEN STOPPING | OPEN | | OPEN | OPEN |
| RED TAG IDENTIFICATION 413 | NOT APPLICABLE | | NOT APPLICABLE | | NOT APPLICABLE | MAP RED TAG TO UNIT / EQUIPMENT, IF NUMBER IS HIGHER THAN THRESHOLD THEN MAINTENANCE STATE |
| MAINTENANCE OVERRIDE SWITCH ACTIVATION | NOT APPLICABLE | | NOT APPLICABLE | | NOT APPLICABLE | IF MAINTENANCE OVERRIDE SWITCH ACTIVATED RELATED TO UNIT / EQUIPMENT THEN MAINTENANCE STATE |
| KEY PERFORMANCE INDICATOR TAGS 414 | NOT APPLICABLE | | LEVEL TAGS ARE BELOW PVLO LIMIT AND TEMPERATURE TAGS ARE AT AMBIENT TEMPERATURE | LEVEL TAGS AND TEMPERATURE TAGS ARE CLOSE TO STEADY STATE VALUES | NOT APPLICABLE | NOT APPLICABLE |
| STANDING ALARM EVENTS | MORE THAN THRESHOLD | | NUMBER OF ALARMS IS BETWEEN SHUTDOWN STATE AND NORMAL STATE | | AT OR BELOW THRESHOLD, I.E. AT STEADY STATE | ABOVE STEADY STATE RANGE |
| OPERATOR CHANGE EVENTS ON ROTATING EQUIPMENT AND SAFETY VALUES 415 | ALL EVENTS ARE STOP / CLOSE COMMANDS | ALL EVENTS ARE TRIP EVENTS | ALL EVENTS ARE OPEN / START OR PROCESS OVERRIDE SWITCHES | | NOT APPLICABLE | ALL EVENTS ARE STOP / CLOSE COMMANDS |

FIG. 4

IDENTIFICATION OF FACILITY STATE AND OPERATING MODE IN A PARTICULAR EVENT CONTEXT

TECHNICAL FIELD

The present disclosure relates to a data driven system and method to determine the state and operating mode of a facility in a particular event context.

BACKGROUND

Facilities, such as industrial plants, refineries, manufacturing plants, pulp and paper plants, steel mills, and office buildings and other buildings can have many states and modes. The facility state refers to the overall state of a facility or a unit in the facility. For an industrial plant, the four generally accepted states of a plant are maintenance, startup, shutdown, and normal operation. During the maintenance, startup, and shutdown states, initial conditions and process parameter values can differ significantly from the normal operation state. The operating mode of the plant is the combined activity of plant units and assets for a period of time to achieve a specified production output. For example, in a petro-chemical refinery plant, the type and quality of the crude oil that is input into the plant will determine the amounts and qualities of the different products that can be refined from the crude oil, such as kerosene, diesel, and gasoline. Consequently, plant states and operating modes are affected by the product that the plant is producing, operational constraints, process constraints, the state of non-automated parameters, the plant load, equipment maintenance, equipment failure, process upsets, and environmental conditions.

There are times when plant stability is most at risk, since these times can be the most difficult to control and anticipate. These times are normally considered to be the maintenance, startup, and shutdown states or events. These are the three most common types of events that occur, that do not fit in with the normal plant operations, and that directly affect the stability of the plant and the safe operations of equipment and processes. In current plant operations, unit/asset performance monitoring and key performance indicators (KPI) do not contain data driven and/or readily consumable information to determine and identify the cause of events, and to diagnose plant state and operating mode.

BRIEF DESCRIPTION OF THE DRAWINGS

FIG. 3 is a chart illustrating the types of data used to train a system to determine a state and operating mode of an industrial plant.

FIG. 4 is a chart for use in determining a state of an industrial plant.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Figure 1:
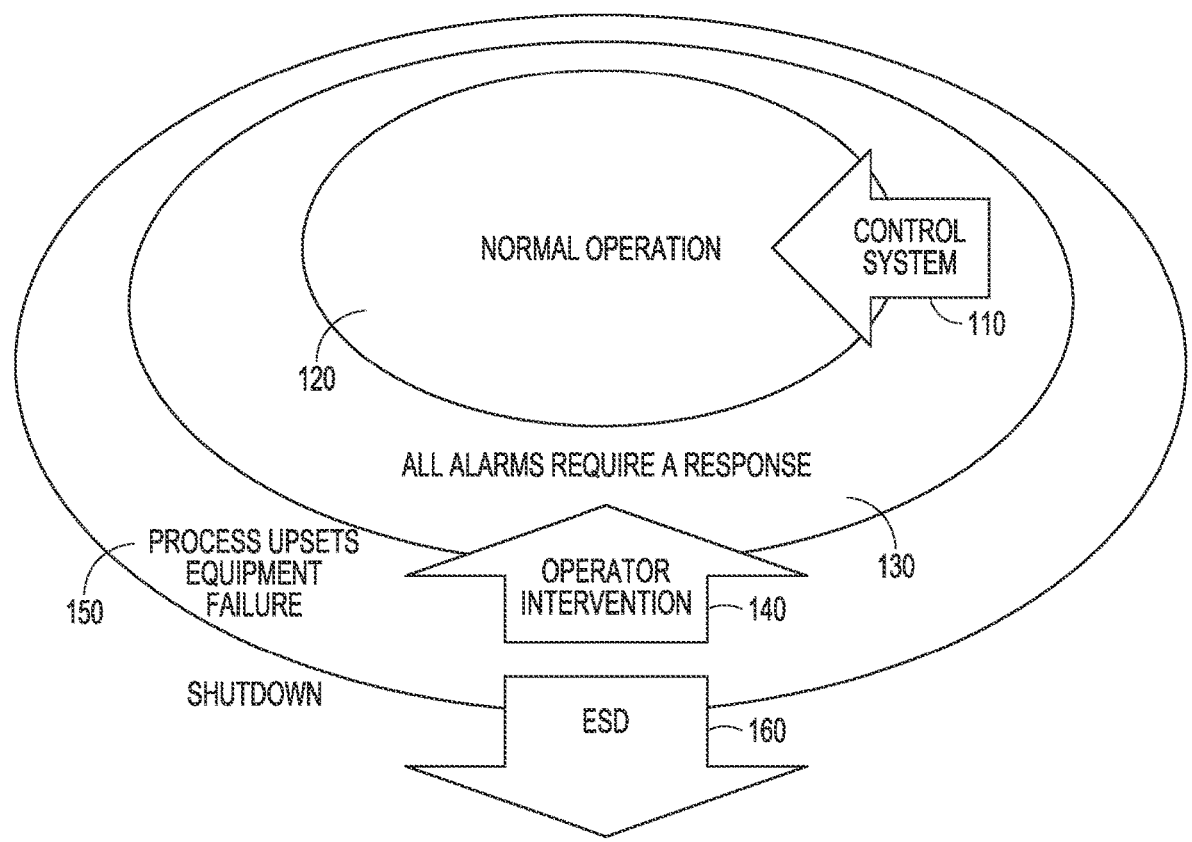
FIG. 1 illustrates an example illustrating the different states of an industrial plant or other facility.

FIG. 1 illustrates an example of different possible states of an industrial plant. While FIG. 1 relates to an industrial plant, other facilities are encompassed by the embodiments of this disclosure such as refineries, manufacturing plants, pulp and paper plants, steel mills, and office buildings and other buildings. In normal operation, a control system 110 manages the normal plant operations 120. An alarm 130 may occur due to process changes or other events, and these alarms may require an intervention 140 by an operator. If the operator is not able to manage the alarm condition, this may lead to process upsets and/or equipment failure or tripping 150. In some instances, in order to avoid plant damage and to manage safety, an emergency shutdown (ESD) system 160 may trip the plant and/or the plant unit.

To address these situations, one or more embodiments are directed to a system and method to identify unique states and operating modes of an industrial plant or other facility during operation of the plant or facility. More specifically, an embodiment describes the implementation and validation of a self-configuring, self-updating, machine learning-based artificial intelligence algorithm to determine a plant state and operating mode by detecting when the relation between manipulated parameters changes. Data that are available in a plant's digital control system are used and therefore no human input is required.

The ability to determine the state and operating mode of a plant in a real-time or close to real-time fashion can be put to use in several different manners to improve the operations of a plant. First, the response of an operator to an event or an abnormal condition in the plant will vary based on the state of the plant and operating mode of the plant at the time the event occurred. Therefore, knowing both the state and mode aids the operator in responding to a plant event. Second, an operator has several process variables (PVs) and key performance indicators (KPIs) trending on his or her control room computer screen that are related to the tag (or tags) in an alarm. Knowing the current plant state and mode will assist an operator in responding to these trends and alarms. Third, an operator uses these trends to determine the response required to manage such an alarm event. Therefore, knowing the current state and mode of a plant will help highlight the behavior and/or reaction of an operator during normal operation, start-ups, trips, and emergency shutdowns.

Additionally, to enable the next level of improvement in industrial plant performance, one or more embodiments include automated methods to perform the following. First, an embodiment can predict lead indications of abnormal events (e.g., process stress). The embodiment that deals with these abnormal events is robust (e.g., increased strength of protection and control systems). Second, the embodiment can estimate future values of key performance indicators (KPIs) to enable the corrective actions that should be taken to address the problem(s). Third, the embodiment can provide real-time guidance to operators to ensure optimal operation of the plant and/or to ensure appropriate responses to events. Fourth, the embodiment can provide an assessment of the on-the-job competency of an operator. Such assessments can then be used to develop and/or improve operator training sessions.

These embodiments include a component to estimate the plant state and plant operating mode. A reason for the need to accurately and on a real-time basis to determine the plant state and plant operating mode is because acceptable performance in one state or operation mode may not be acceptable in another state or operating mode. The correct determination, in a real-time or near real-time basis, of plant state and operating mode therefore assists in predicting lead indications of abnormal events, estimating future values of KPIs, providing real-time guidance to operators, and evaluating operator on-the-job performance.

The conditions that lead to and/or cause changes or variances of the plant state and plant operating mode are as follows. The type of product that is being produced by the plant influences the plant state and operating mode. A plant unit or plant asset may be configured distinctly for different product types. For example, if the two different products are kerosene and diesel fuel, patterns of time series process variable data for temperatures and pressures in a distillate column will be different when the plant operations are in the different modes. Additionally, these changes can be sensed when there is a changeover from one product to another product. Consequently, these different product types can be reflected in on-line or off-line analyzer measurements of the feed input used to make the product and the actual product output itself. The plant state and operating mode can also change when the plant is going through a maintenance period, a startup period (cold or hot), and a planned or unplanned shutdown. A plant unit or plant asset may be configured distinctly for different plant loads, that is, different product throughputs (e.g. 50% or 90% of total capacity). These different plant loads are reflected in process variable data of feed/input flow tag values. Environmental conditions around the plant may be distinct and may affect the plant state and plant operating mode. For example, in a food processing plant, there are more likely than not different cooling needs in the summer months versus in the winter months. Such differences can be reflected in process variable data related to utility flow rate. Also, various process constraints may exist at a plant, which could affect the plant state and/or plant mode. For example, a constraint could be that a particular unit or asset is not available. As another example, a catalyst could have become degraded, and the plant process would then have to be run at higher temperatures. Lastly, there are various non-automated parameters in a plant such as hand valves and manual lockouts of units/assets, and the status of these non-automated parameters can affect the plant state and plant mode.

Figure 2:
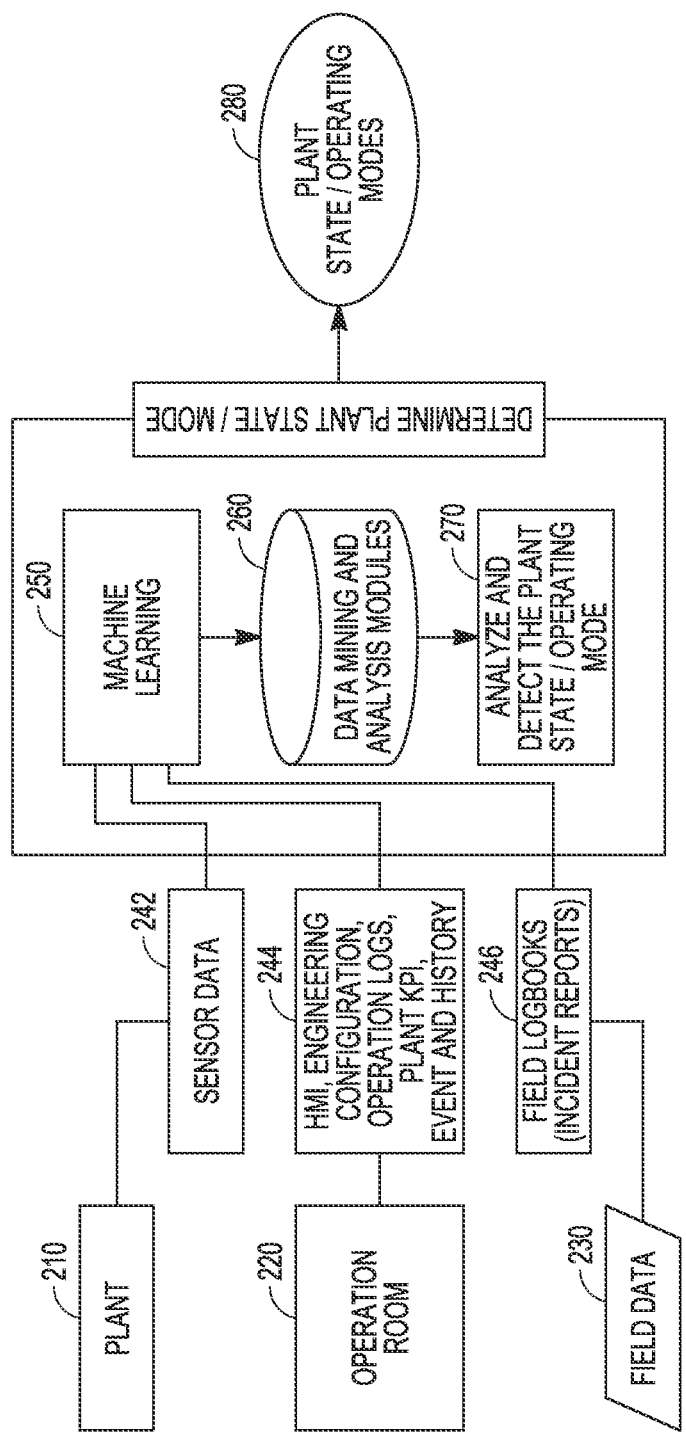
FIG. 2 illustrates a diagram of an embodiment of a system to determine industrial plant states and industrial plant modes.

In response to the need to be able to accurately determine on a real-time or near real-time basis a plant state and plant mode of an industrial plant, one or more embodiments invoke a self-configuring, self-updating, machine-learning based artificial intelligence algorithm to determine plant state and plant operating mode (when the plant is in a normal operating state) by detecting the relationship between manipulated parameter changes. An embodiment processes and integrates multiple data sources to learn about the plant states and plant modes. FIG. 2 illustrates the primary data sources that are used to first train a model to determine a plant state and plant operating mode, and thereafter to interpret in real-time production data to determine the plant state and plant operating mode. In an embodiment, the training is executed using a clustering method. The primary data sources include sensor data (process parameter values) from plant process histories; human machine interface (HMI) graphics, operation logs, and plant key performance indicators (KPIs); and engineering configuration data field logbooks (e.g., incident reports) from field operators. These data sources are normalized and integrated into formats that are clustered and grouped into distinct plant states and operating modes. FIG. 2 illustrates these data sources, and the overall training process and execution process. Specifically, time series process values, events data, and log file data are integrated from a plant 210, an operation/control room 220, and field data 230. These data can include sensor data 242; HMI data, engineering configuration data, operation logs, plant KPI data, and events and history data (244); and field logbooks and incident reports (246). These data are first processed in the machine learning/training phase 250. This learning/training generates data mining and analysis modules/models 260. The production data are then analyzed at 270 to detect the plant state and plant operating mode at 280.

The integration of the multiple data sources in FIG. 2 includes the integration of process parameter values with HMI data. This integration is further illustrated in FIG. 3. As illustrated in FIG. 3, the identification of values of input and output flow tags for assisting in the analysis of feed input and final product output flow patterns determines plant state and plant operating mode. More specifically, FIG. 3 illustrates the types of data 310, the information 320 that is extracted from that data, and the use 330 of that information in determining the state and operating mode of the plant. The types of data include events data 312, configuration data 314, graphics data 316, process history data 318, and operator log data 319. The process history data 318 and operator log data 319 are used primarily in the training of the system, although historically-based configuration data 314 and graphics data 316 can also be used. The events data 312 are real-time data that are used as input to the trained system, and which the trained system uses to determine the plant state and mode. As an example, when a plant is operational, a process alarm 313 may occur. The process alarm may relate to a status of a piece of rotating equipment 322, such as the revolutions per minute (RPMs) of the rotating equipment 322 is below its normal operating value. Then, as indicated at 332, these events data 312 assist in the identification of the different states of the plant.

The process of using event data 312 to identify the plant state and mode is further illustrated in FIG. 4. Shutdown, startup, normal operation, and maintenance states are identified using data for flow tags 405, rotating equipment statuses 406, and other information as detailed in FIG. 4. All conditions in FIG. 4 should be TRUE for an operator to conclude that the plant is in a particular state. For example, if the flow tags are decreasing and trending down towards the process variable lower limit and there is a ramping down of feed flows (411), rotating equipment (e.g., pumps and other equipment that move input materials and output product) is being stopped sequentially (412), safety (ESD valves) are being closed sequentially (413), standing alarm events exceed a threshold (414), and the operator is issuing stop and close commands (415), then all conditions for a normal shutdown (410) are TRUE and it can be concluded that the plant is going through a normal shutdown. Once again, this is the intelligence that the system is taught so that the system can determine the state and mode of the plant.

In a similar fashion, FIG. 4 illustrates the data that are used to determine whether the plant is in a state of an emergency shutdown (420), a cold startup (430), a hot startup (440), a normal operating state (450), or a maintenance state (460).

As noted above, an embodiment first determines in a real-time or near real-time the state of an industrial plant, and then, if the plant is in a normal operating state, determines the operating mode of the plant. Knowing the plant state and operating mode allows an operator to determine if a current event (as indicated by a process variable for example) is of concern or not. Before addressing the details of the embodiment, the different possible plant states are discussed in further detail.

Normal plant operation is the state of a plant in which an operator maintains the operating variables/parameters within defined operating limits. The plant processes should run at steady state conditions. Significant deviations from the normal operation lead to an upset condition. The normal operation of a plant has two sub-states—normal and off normal. The normal state is detected by analyzing if process variable (PVs) values of all parameters are within the operating range without any alarm events. The normal state has two further sub-states —optimized operation and non-optimized operation. Optimized operation is detected by analyzing if the PVs have minimal deviations from defined set points (SPs). Non-optimized operation is detected by analyzing if the PVs deviate from the SPs, but the PVs do not cross any alarm limits. The off normal state includes alarm events, which are detected by analyzing if PVs have deviated from the alarm limit values.

Major shutdowns in industrial plants typically happen infrequently (every year or two). However, when such shutdowns occur, they normally take several days to complete. In general, these shutdowns have two objectives. First, to repair problems identified during previous major shutdowns, and second, to inspect parts of the plant not accessible during operation in order to identify problems that will be repaired during future planned shutdowns. There are generally two types of shutdowns—normal shutdowns and emergency shutdowns. A normal shutdown is part of a plant safeguarding system and its purpose is to minimize the frequency and consequences of excursions outside the facility operating envelope. Possible causes of a normal shutdown include composition changes in the feed (e.g., feed stock changes, products requirement variations), process limitations (e.g., limitations of exchangers, vessels, columns, and other equipment to meet process demands), maintenance activities (e.g., regeneration/activation of catalysts, management of delta pressure or heat transfer issues through furnaces/exchangers, maloperation of compressors, pumps, and columns), and management of parameter issues that degrade products. An emergency shutdown is part of a plant safeguarding system and its purpose is to keep the plant processes within design limits and to prevent the escalation of abnormal conditions into a major hazardous event. The possible causes of an emergency shutdown include equipment failure, process upsets/trips, process/operational constraints like pipeline choking, flooding/weeping in columns, runaway conditions, over pressurization, and process control issues.

A plant startup is identified as the time between a shutdown and normal operation. A plant startup has two sub-categories—cold startup and hot startup. In a cold startup, variables such as casing temperatures, shaft temperatures, and bearing temperatures of equipment are at ambient temperature and there is zero (0%) holdup in the sumps, vessels, and other similar equipment. A cold startup is normally followed when equipment, such as a turbine, is in stop/standby condition for more than a certain amount of time, such as 20 hours. In hot startup, the variables such as casing temperature, shaft temperature, and bearing temperature are not equal to ambient temperature, and holdups in the sumps, vessels, and other equipment are more than 0%.

Typical causes for entering an unplanned maintenance state include failure to replace worn out parts, lack of lubrication, and other issues. Information indicating the maintenance state is captured in condition monitoring alarms, maintenance override switch (MOS) activation events, red-tags identifications (tagged equipment that is taken out of service), and flows across plant equipment.

As previously noted, when it is determined that the plant is in a normal operating state, then an embodiment can determine not only the current operating mode of the plant, but whether an event in the plant is cause for concern. This determination of whether there is a need for concern is based on a machine learning (ML)/artificial intelligence (AI) algorithm that was trained with historical plant data (to learn the relationships among all related events/data/equipment) and the instant event, and the use of the trained ML/AI algorithm to make a decision on the need/cause for concern in view of a plant event. In an embodiment, the ML/AI algorithm involves a clustering method.

Plant operating mode varies based several factors. These factors include the type of product that is being produced, the current load of the plant, the environmental conditions under which the plant is currently operating, any operational constraints, and the states of any non-automated parameters. An embodiment determines that a plant unit/asset is in a different operating mode when the values of key variables move into another steady state, or when correlation between parameters changes (as learned by the training of the ML/AI algorithm). During normal plant operation, all alarm events require a response from the operator to return to normal operating range. However, an operator may face different scenarios like the flooding of events (i.e., multiple events or alarms occurring at the same time), operational constraints (which would prevent the operator from responding to an alarm/event in the most effective manner), and flow tag trends. To respond to events optimally, it is necessary to be able to distinguish among such scenarios. Operating mode identification provides the context for an event, i.e. the operating mode within which a given event occurs. Simply put, to enable accurate fault detection it is necessary to accurately detect the plant unit/asset operating mode because a fault in one operation mode may not be a fault in another operating mode. The method to determine the operating mode in an embodiment is discussed in connection with FIGS. 5A, 5B, 6A, 6B, 7A, and 7B.

There are several unique and novel features to one or more embodiments of the present disclosure. First, an embodiment can automatically identify plant critical tags that impact the state of the plant. That is, given an event on a single or group of process variables (PVs), there are specific related PVs that need to be examined to determine the plant state and operating mode at the time of an event. These related PVs were learned from the ML/AI algorithm that was trained on plant historical data. This embodiment can auto-identify and process the principle data components related to a candidate tag using configuration data and graphics data (HMI).

Second, an embodiment can identify in real-time the operating mode of a plant. As noted previously, the embodiment uses historical plant data to machine-learn plant operating modes, and then uses the machine-learned models to process real time data from the plant and determine the operating mode of the plant. Additionally, the database containing learned operating modes (models) is updated when new operating modes are identified through the learning process and these new modes are confirmed by an operator. The features of this embodiment can assist and guide an operator in the real time operation of the plant.

Third, an embodiment enables plant process optimization in real-time by identifying and evaluating deviations from steady state values to determine the durations when the plant is not in optimal operating modes and further identifying the factors causing the operation to deviate. This information will enable the operator to adjust parameters to further optimize the process. Once again, this is further aided by the trained models that identify, in real-time, the plant state and the plant operating mode.

Fourth, as mentioned above, an embodiment enables additional systems for industrial plant monitoring that results in the next level of improvement in plant performance. For example, the embodiment can predict lead indications of abnormal events and improve the robustness of dealing with these abnormal events. Future values of key performance indicators (KPIs) can be estimated to enable corrective actions to be taken. On-the-job competency of the operator can be assessed to enable training interventions. Real-time guidance can be provided to operators to ensure optimal operations.

FIGS. 5A, 5B, 6A, 6B, 7A, and 7B are block diagrams illustrating operations and features of systems and methods to determine the state and operating mode of a plant. FIGS. 5A, 5B, 6A, 6B, 7A, and 7B include a number of blocks 505-576, 605-674, and 705-761 respectively. Though arranged substantially serially in the examples of FIGS. 5A, 5B, 6A, 6B. 7A, and 7B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 5A:
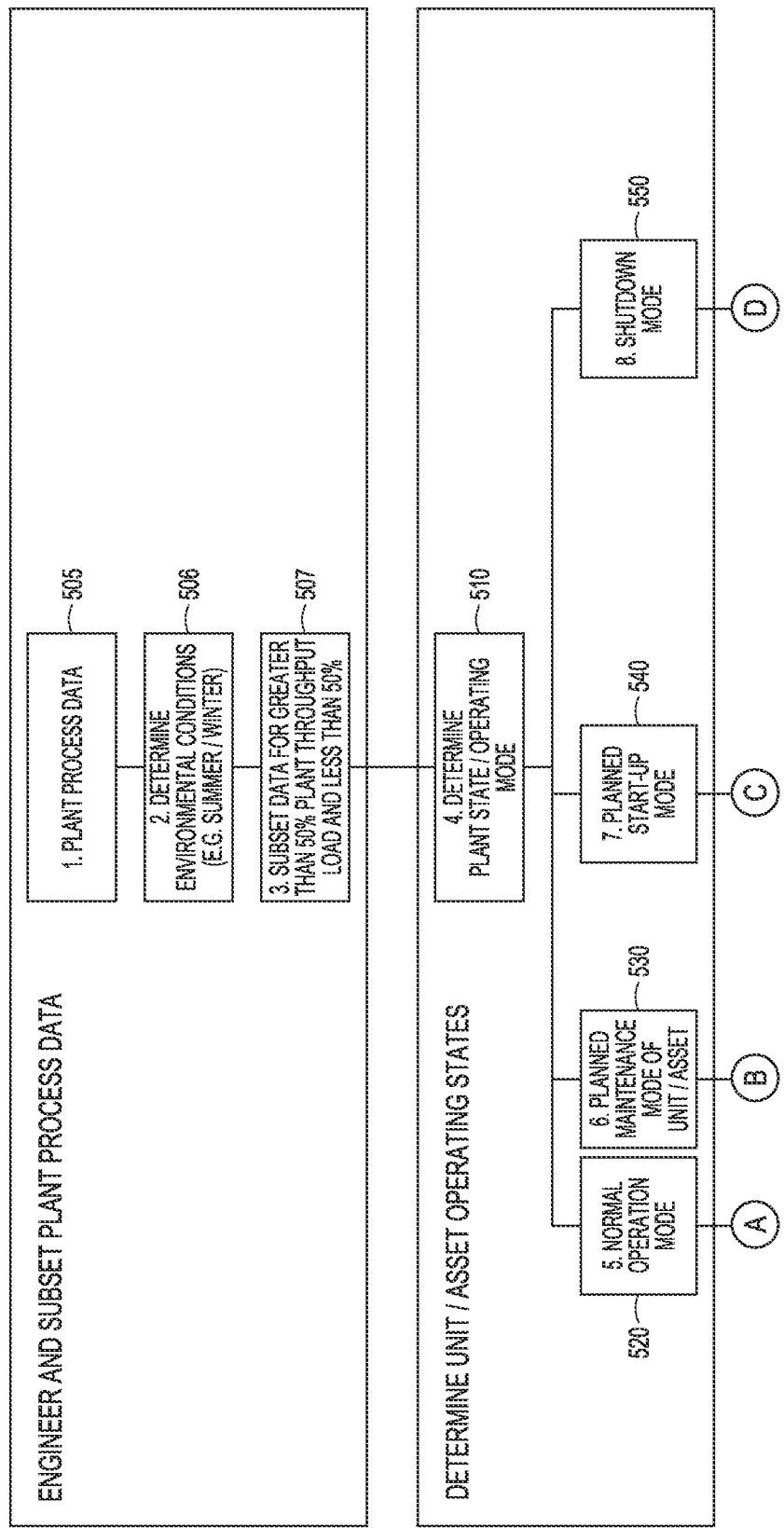
FIGS. 5A and 5B are a flowchart of an embodiment to determine the state and operating mode of a plant.
Figure 5B:
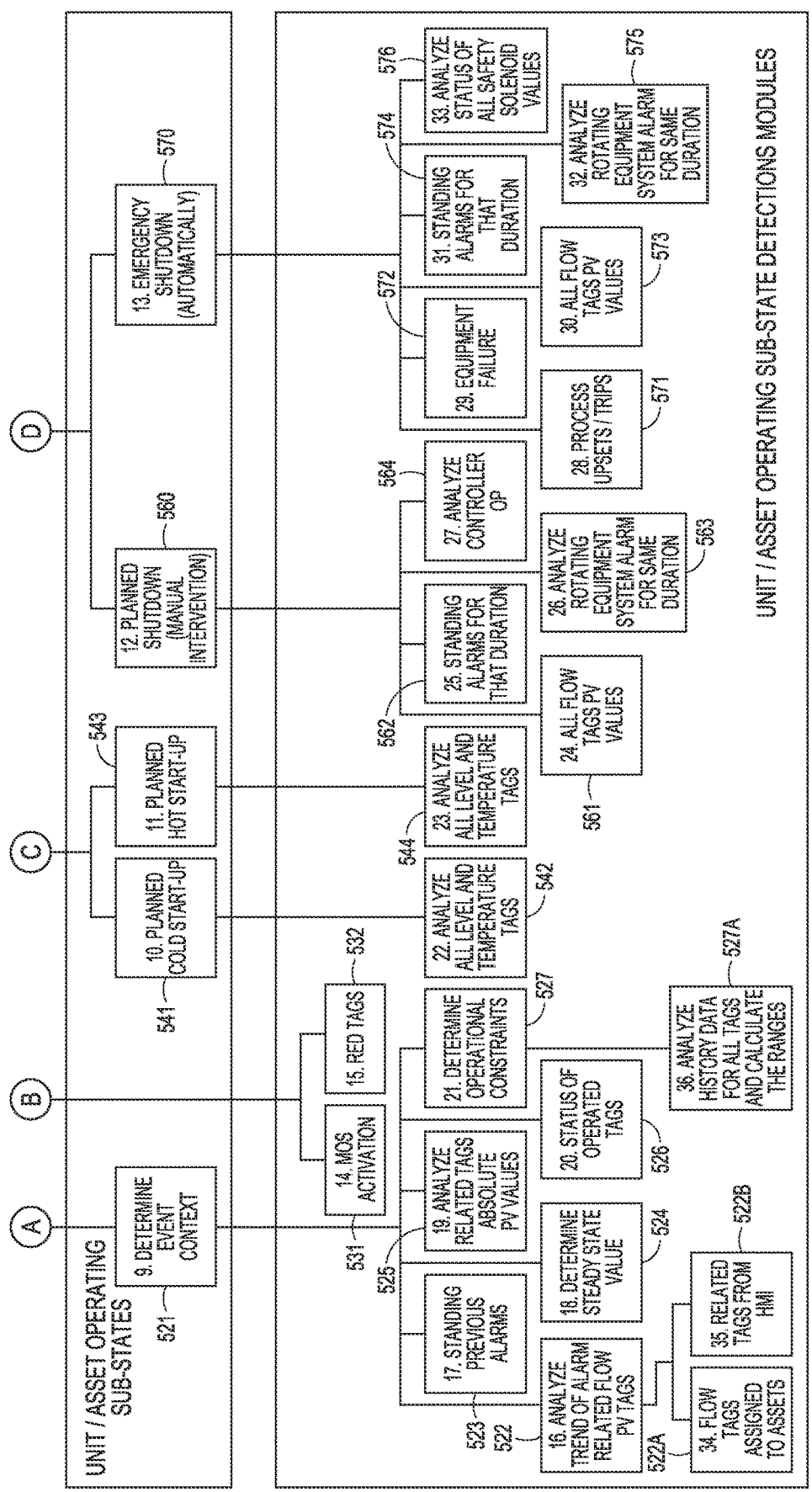

Referring first to FIGS. 5A and 5B, operations 505, 506, and 507 execute data engineering tasks to prepare the plant data for analysis to determine the plant state and mode. This preparation includes segmenting the data into subsets. At 505, the plant data are initially processed by collecting the data and preparing for analysis all the data listed in FIG. 3. At 506, the environmental conditions that the plant is operating under are prepared by subsetting the data for different environmental conditions (e.g. summer/winter). This is accomplished by analyzing environmental parameters (e.g., ambient temperature, site specific weather reports) from the process data such that for example data from the summer months are placed into one set and data from the winter months are placed in another set. At 507, the data are subsetted as a function of the plant load. For example, in an embodiment, the data are subsetted based on a greater than 50% plant throughput load and a less than 50% plant throughput load. In operation 507, tags for plant KPI PV data (e.g., controller PV, SP data) and throughput data are identified using the configuration data (FIG. 3, No. 314) and HMI data (FIG. 2, No. 244). The values of these tags are used to subset data for greater than 50% plant throughput load and less than 50% plant throughput load. For example, at a 50% load, only one out of three pumps may be required. However, at 100% load, two out of three pumps may be required. Operations 505, 506, and 507 result in several subsets, each subset representing a distinct period of operation. Each distinct period of operation is processed separately by the following processes.

Further in the data preparation stages of operations 505, 506, and 507, history data for each tag are analyzed to determine the distribution and density of data values. The percentage of the data in each range is calculated. The ranges where most of the data are present are assumed to be the steady state ranges. It is noted that these may or may not be contiguous ranges.

At 510, the plant state and plant operating modes of the industrial plant are determined using the data from operations 505, 506, and 507. Operation 510 involves the determination whether the plant is in a state of normal operation 520, planned maintenance 530, planned startup 540, or shutdown mode 550. The process for determining normal operating mode begins at operation 520, and includes the determination of the context 521 of an event, such as a process alarm 313. At 522, the trends of the event and their relations to related process value flow tags are analyzed. As indicated at 522A, these flow tags are assigned to particular plant assests. Flow tags that may be related to the flow tags at 522A are considered at 522B. At 523, standing previous alarms are considered. For example, if an upstream alarm is standing (i.e., it has not be solved and reset), then the eventual addressing of the problem that caused the standing alarm may also address the current alarm 521 at issue. At 524, the steady state value of the process variable with which the alarm is associated is determined. The extent of the deviation from the steady state process value can assist in determining the seriousness of the alarm. At 525, related tags are analyzed, once again to assist in determining the event context. At 526, the statuses of other operator tags can be considered. Finally, at 527, other operational constraints are considered. For example, a particular plant unit may currently be out of service. This may involve analyzing historical data for all tags and calculating pertient ranges (527A).

At 530, the system is trained to identify that the plant is in a planned maintenance state. It can be determined that a plant is in a planned maintenance state at 531 by noticing maintenance override switch (MOS) activation, and at 532 by determining that a particular piece of equipment or plant unit has been red tagged (i.e., a red tag has been attached to the equipment indicating that it is not in proper working order).

Operation 540 details a determination that a plant is in a planned startup state. As noted in FIG. 5B, the planned startup can be either a cold startup at 541 or a hot startup at 543. Irrespective of whether it is a cold startup or a hot startup, at 542 and 544, all operating levels and temperature tags are analyzed to determine and verify whether it is a cold startup or a hot startup. This is further detailed in FIGS. 6A and 6B.

Operation 550 and its related operations determine that the state of the plant is a shutdown state. At 560, it can be determined that the shutdown is a planned shutdown, and at 570, it can be determined that the shutdown is an emergency shutdown. First addressing a planned shutdown 560, all process value flow tags are analyzed at 561. At 562, all standing alarms during the duration of the planned shutdown are analyzed. The standing alarms may provide information on the reasons for the planned shutdown. Similarly, at 563, rotating equipment alarms are analyzed during the duration of the planned shutdown. Finally, at 564, the controller operations are analyzed in connection with the planned shutdown.

As indicated at 570, an emergency shutdown is handled automatically by the plant system. Historically, such emergency shutdowns could be handled either automatically by the plant system or manually by an operator (for example, when the operator observes that a process value is out of the safe operating range). Similarly, in an embodiment, an emergency shutdown can be handled automatically or by operator intervention. An advantage of an embodiment however is that the emergency shutdown decision is more robust because of the training and learning of the system. As indicated at 571, an emergency shutdown can be triggered by process upsets and/or process trips, or as indicated at 572, by the detection of equipment failure. During an emergency shutdown, all process value flow tags are recorded and analyzed at 573. Like the case for a planned shutdown 560, all standing alarms during the duration of the emergency shutdown are analyzed at 574, and at 575, any rotating equipment alarms are analyzed during the duration of the emergency shutdown. Finally, at 576, the statuses of all safety solenoid values are analyzed.

Figure 6A:
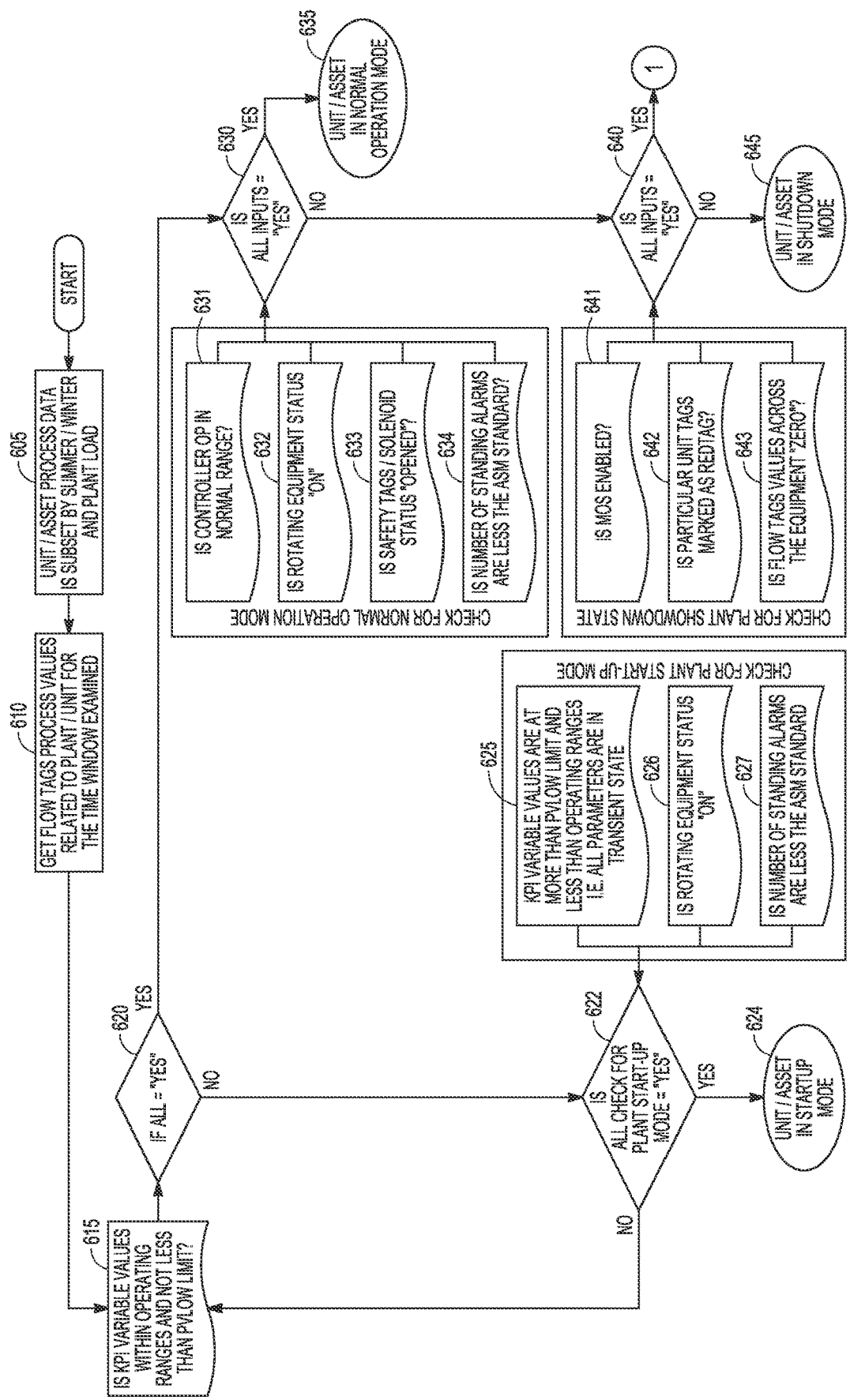
FIGS. 6A and 6B are a flowchart of another embodiment to determine the state and operating mode of a plant.
Figure 6B:
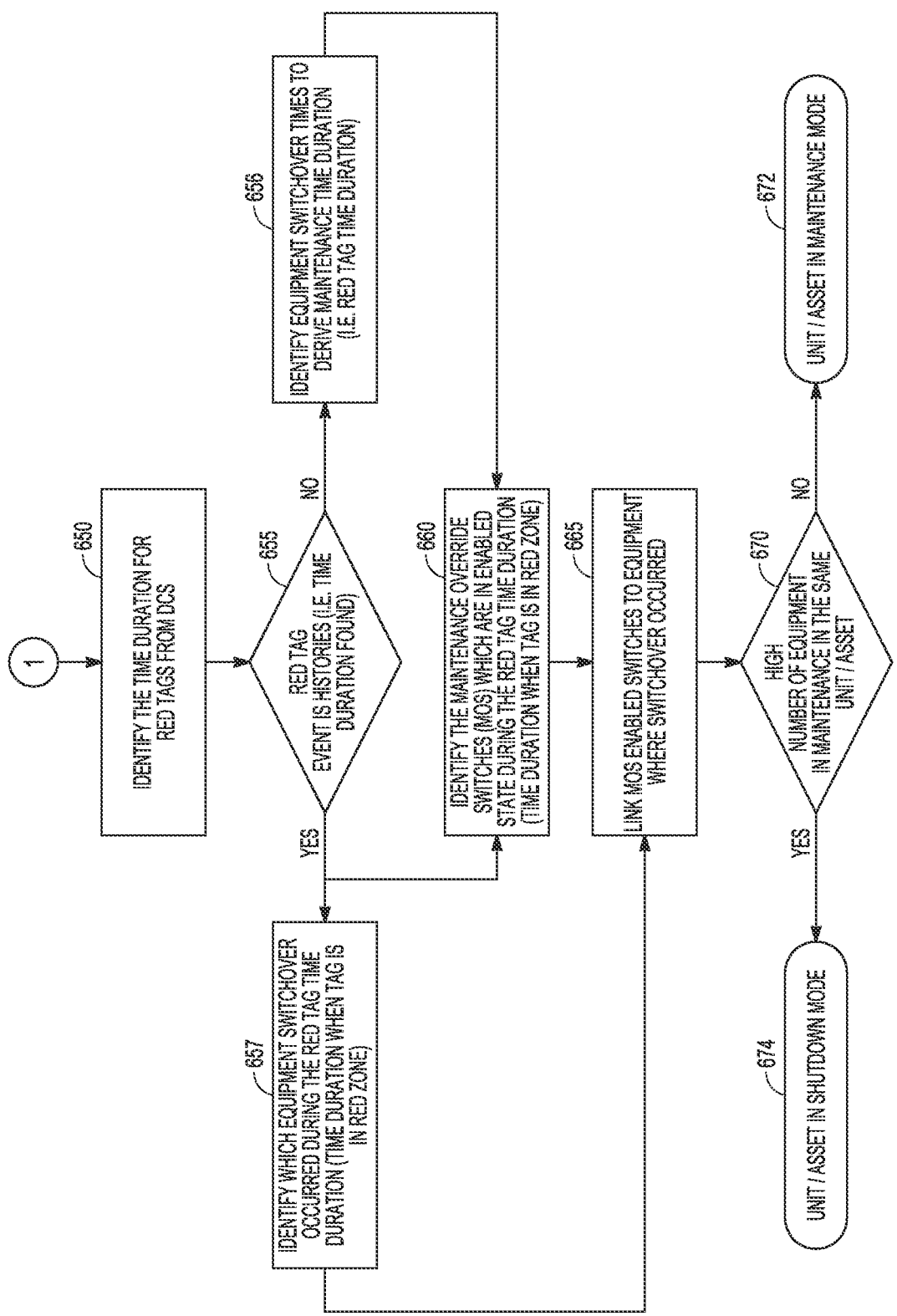

This process of the determination of the plant state illustrated in FIGS. 5A and 5B is illustrated in more detail in FIGS. 6A and 6B. At 605, similar to operations 506 and 507, the plant unit/asset data are subsetted by environmental conditions and the plant load. At 610, the history data relating to each plant unit/asset are retrieved, and the time window for the asset is examined. Then, at 615, the key process indicator (KPI) variable values are checked to determine if they are in the proper operating ranges and not less then the process variable lower limits. At 620, if not all KPI variable values and all are in the proper operating ranges and not all KPI variable values are not less then the process variable lower limits, then the system at 622 determines if the plant is in the startup state 624. In order to make the check at 622 and the determination at 624 that the plant is in the startup state, then all KPI values must be in the transient state (i.e., all KPI process variable values are greater then the process value lower limit and are less than the operating ranges) at 625, all rotating equipment statuses must be on at 626, and the number of standing alarm must be less than a threshold (e.g., less than the ASM standard) at 627.

If at 620 all KPI variable values are in the proper operating ranges and all KPI variable values are not less then the process variable lower limits, then the process checks at 630 if the plant is in a normal operating state. If the controller operations of the plant are all in the normal range (631), and if the statuses of all rotating equipment is on (632), and all safety solenoid tags are opened (633), and the number of standing alarms are less than a threshold (e.g., less than the ASM standard) (634), then at 630 it is determined that the plant is in a normal operating state 635.

If the plant is not in a normal operating state at 630, 635, then the system checks at 640 to determine if the plant is in a shutdown state 645. This is executed by determining if MOSs are enabled (641), if particular plant units have been red tagged (642), and if flow tag values across the plant equipment are equal to zero (643). If one or more of operation 641, 642, and 643 are not true, then it is determined that the plant is in a shutdown state at 645. If all operations 641, 642, and 643 are true, beginning at 650, the system determines if the plant is in a shutdown state 674 or a maintenance state 672. Specifically, at 655, an inquiry is made if the amount of time that a particular piece of equipment has been red tagged can be determined. If that determination cannot be made, then at 656 equipment switchover times are identified in order to derive the maintenance time duration (i.e., the red tag time duration). If that determination can be made at 655, that at 657, the equipment that switched over during the red tag duration time is identified (i.e., the amount of time that the equipment was red tagged). In either event, after operations 656 and 657, at 660, the maintenance override switches (MOS) that are enabled during the duration of the red tag event are identified (i.e., the time that the tag was in the red zone). At 665, the MOS enabled switches are linked to equipment where the switchover occurred, and at 670, if there is a large number of plant assets in a plant unit in maintenance, then the plant unit is in a shutdown state at 674. If not, then the plant unit is in maintenance mode at 672.

Figure 7A:
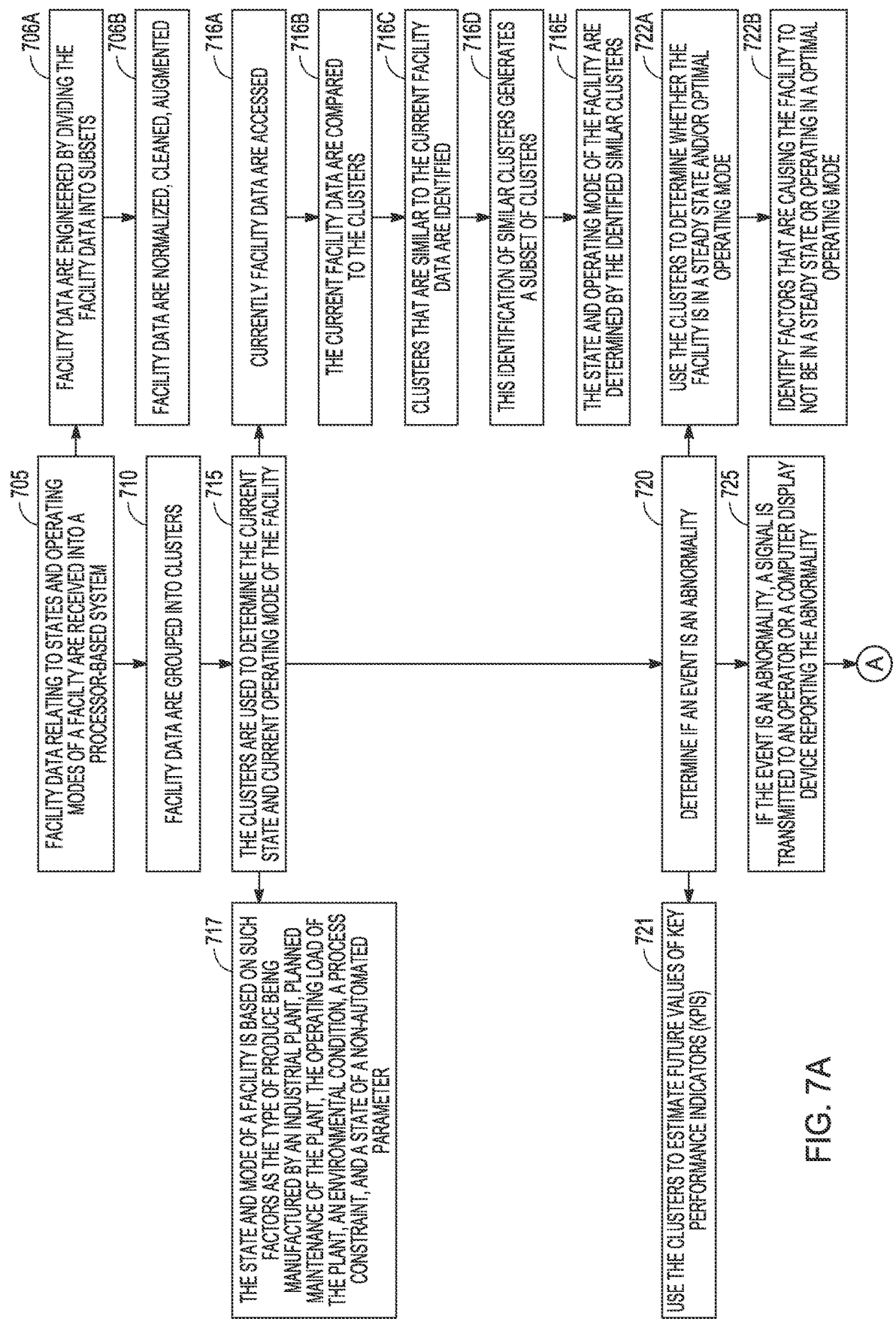
FIGS. 7A and 7B are a flowchart of another embodiment to determine the state and operating mode of an industrial plant.
Figure 7B:
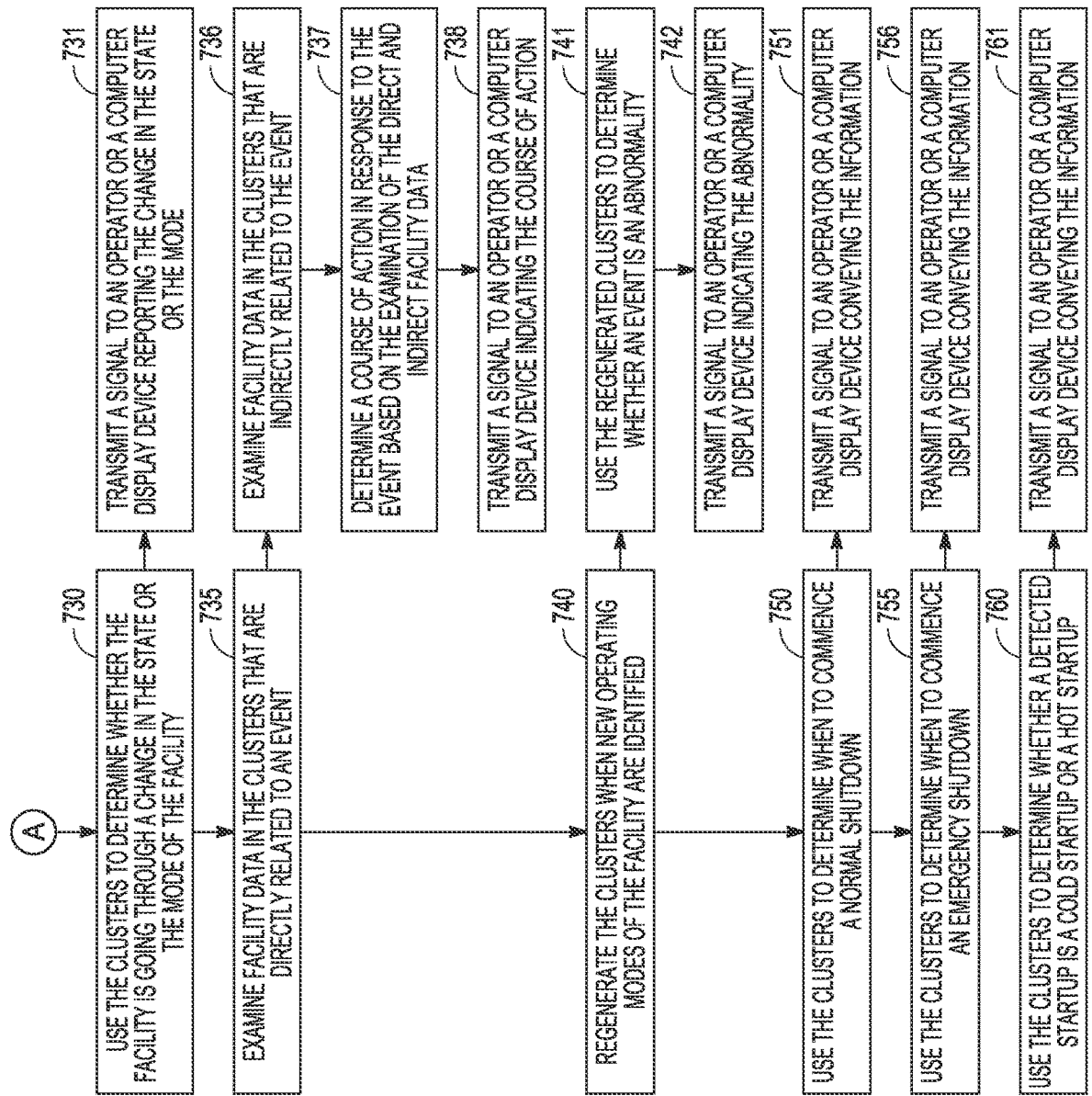

FIGS. 7A and 7B are a flowchart of another example embodiment that uses programmed expert intelligence and machine-learned relationships among facility process variables to determine the current state and operation mode of the facility. The current state and operating mode of the facility can then be used to determine if a plant event is truly abnormal, to properly estimate future values of key performance indicators (KPIs), to provide real-time guidance to facility operators, and to evaluate on-the-job actions of the facility operators. Referring now specifically, to FIGS. 7A and 7B, at 705, facility data relating to states and operating modes of a facility are received into a processor-based system. These facilities can include industrial plants such as oil refineries, chemical plants, pulp and paper plants, and steel mills. These facilities can also include buildings such as office buildings and schools. The facility data can include processing data such as events (e.g., alarms from process variable sensors) data, configuration data, graphics data, historical process data, human machine interface (HMI) graphics data, key performance indicator (KPI) data, and operator log data. See FIG. 2. The facility data can also include building status data. In an embodiment, the facility states can include such states as a normal state, a startup state, a shutdown state, and a maintenance state. The facility mode relates to the particular configuration of the facility, such as whether a refinery is manufacturing diesel fuel or kerosene, or whether an office building is using its cooling system or heating system.

In an embodiment, the data are engineered prior to further processing. For example, as indicated at 706A, the facility data are engineered by dividing the facility data into subsets. These subsets can be based on certain environmental conditions, certain facility load conditions (e.g., the facility is operating at 80% of capacity), and certain time windows. Additionally, as indicated at 706B, the facility data can be normalized, cleaned (e.g., by removing outliers), and by filling in missing data (e.g., by interpolation).

At 710, the facility data are grouped into clusters. While clustering is used in one embodiment, other forms of machine learning could also be used. Each of the clusters relates to a particular facility state and a particular facility operating mode. Further, each of the clusters includes descriptors that relate to the particular facility state and the particular facility operating mode. For example, descriptors can include process variable values, process variable ranges, HVAC set points, and temperature ranges. The result of the clustering is a plurality of clusters relating to different facility states and facility operating modes. At 715, the clusters are used to determine the current state and current operating mode of the facility. For example, as indicated at 716A, currently facility data are accessed, and at 716B, the current facility data are compared to the clusters. At 716C, clusters that are similar to the current facility data are identified. This identification can be executed by, for example, identifying clusters whose data are within a certain percentage of the current facility data, for example within 10%. In other embodiments, other numerical analysis techniques can be used to identify similar clusters. As indicated at 716D, this identification of similar clusters generates a subset of clusters. Then, at 716E, the state and operating mode of the facility can be determined by the identified similar clusters. As noted at 717, the state and mode of a facility can be based on such factors as the type of product being manufactured by an industrial plant, planned maintenance of the plant, the operating load of the plant, an environmental condition, a process constraint, and a state of a non-automated parameter.

As noted above, in an embodiment, the states of a facility can be a normal state, a startup state, a shutdown state, and a maintenance state. When the facility is in a normal operating state, then at 720, it is determined if an event, such as an alarm or a change in a facility process, is an abnormality. At 725, if the event is an abnormality, a signal is transmitted to an operator or a computer display device reporting the abnormality. In addition to determining if an event is an abnormality at 720, the system can further execute other operations when the facility is in a normal state of operations. For example, as indicated at 721, the system can use the clusters to estimate future values of key performance indicators (KPIs). Like in connection with a determination of an abnormality, the determination of future values of the KPIs can provide real-time guidance to an operator of the facility (e.g., advising operator to shut down plant, decrease flow rate of an ingredient, etc.), and can further be used to evaluate on-the-job actions of the operator (e.g., determining if and/or how closely an operator followed advice, and/or the outcome of the operator following of the advice).

When it is determined that the facility is in a normal operating state (720), then at 722A, the system can use the clusters to determine whether the facility is in a steady state and/or optimal operating mode. For example, the system could have learned from the clusters that when certain KPIs and/or process variables are within a certain percentage of their set points, then the facility is in a steady state and/or optimal operating mode. Conversely, at 722B, if the facility is not in a steady state or optimal operating mode, then an analysis using the clusters can identify one or more factors that may be causing the facility to not be in a steady state or operating in an optimal operating mode.

In addition to determining whether an alarm is a cause for concern based on the current state and operating mode of a facility (as learned from machine learning of historical data), the system can execute several other functions based on the machine learning. For example, at 730, the system can use the clusters to determine whether the facility is going through a change in the state or the mode of the facility. In an embodiment, this can be executed by examining values of key process indicators (KPIs) in the clusters. Additionally, correlation changes among the facility data can be examined. At 731, the system can transmit a signal to an operator or a computer display device reporting the change in the state or the mode.

The system can also determine a relationships among facility data based on the machine learning. For example, an examination of facility data that are directly related to an event and facility data that are indirectly related to the event. Specifically, at 735, facility data in the clusters that are directly related to an event are examined. An example of directly related data is pressure data in a holding tank that resulted in a high pressure alarm. Then, at 736, facility data in the clusters that are indirectly related to the event are examined. An example of indirectly related data is a flow rate in a pipe that feeds the holding tank. At 737, the system determines a course of action in response to the event based on this examination of the direct and indirect facility data. Then at 738, the system transmits a signal to an operator or a computer display device indicating the course of action.

While the system can be initially trained with historical facility data, the system can be retrained as more current data become available. Specifically, as indicated at 740, the clusters can be regenerated when new operating modes of the facility are identified. At 741, the regenerated clusters are used to determine (once again, when the facility is in a normal state), whether an event in the facility comprises an abnormality. Lastly, at 742, a signal is transmitted to an operator or a computer display device indicating the abnormality.

In addition to determining that a facility is in a normal state, the system can also determine if the facility is currently in other states and/or when other states should be initiated. For example, the system can use the clusters to determine when to commence a normal shutdown (750), when to commence an emergency shutdown (755), and whether a detected startup is a cold startup or a hot startup (760). After each of these, a signal is transmitted to an operator or a computer display device conveying the information (751, 756,761).

Figure 8:
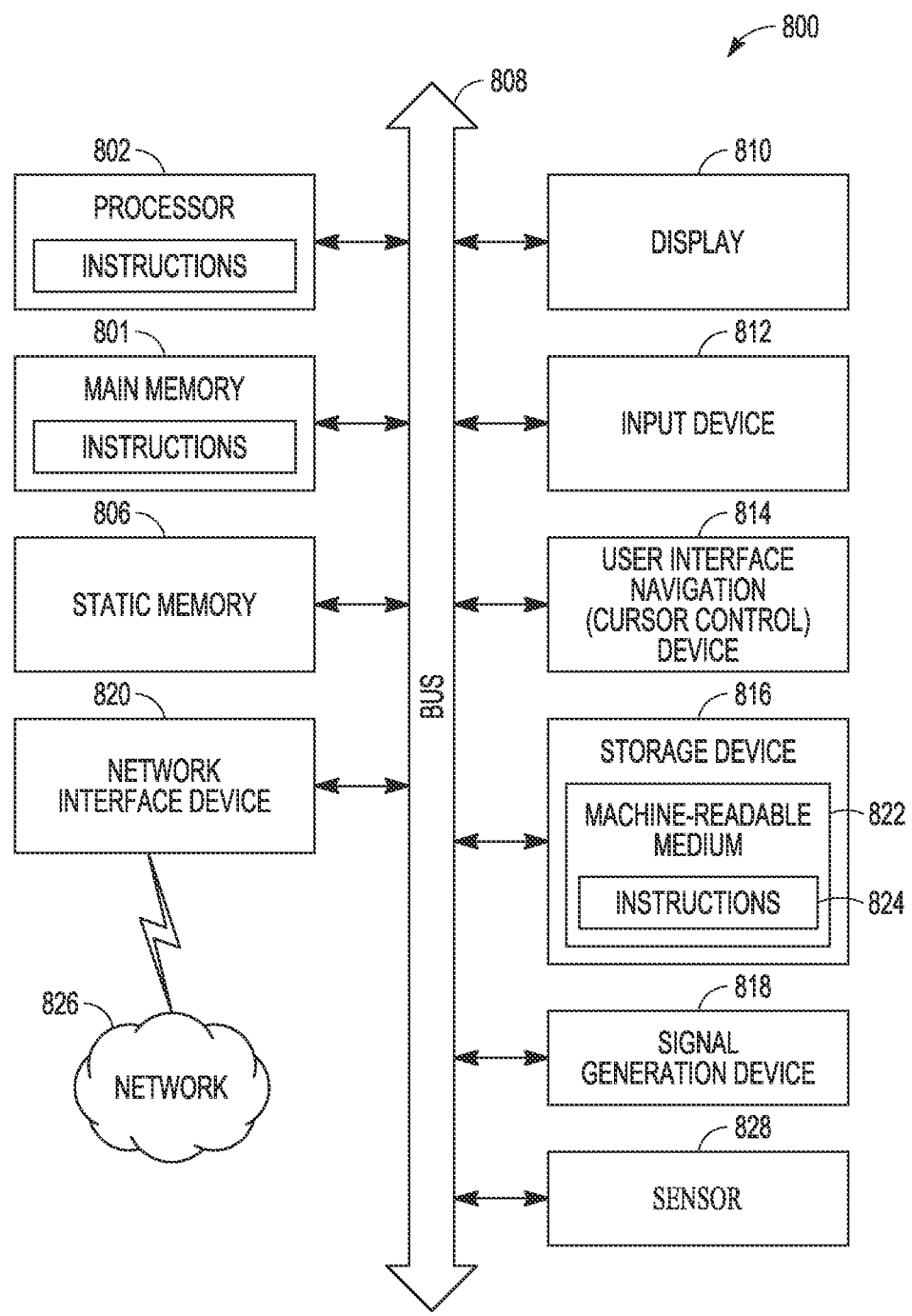
FIG. 8 is block diagram of a computer system upon which one or more of the embodiments of this disclosure can execute.

FIG. 8 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 801 and a static memory 806, which communicate with each other via a bus 808. The computer system 800 may further include a display unit 810. The computer system 800 may additionally include a storage device 816 (e.g., drive unit), a signal generation device 818 (e.g., a speaker), a network interface device 820, and one or more sensors 828, such as a global positioning system sensor, compass, accelerometer, or other sensor.

The drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 801 and/or within the processor 802 during execution thereof by the computer system 800, the main memory 801 and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 824 may further be transmitted or received over a communications network 826 using a transmission medium via the network interface device 820 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
    receiving by a computer processor, facility data relating to states of a facility and operating modes of the facility;
    clustering, by the computer processor, the facility data into groups representing facility states and facility operating modes, thereby generating a plurality of clusters relating to the facility states and facility operating modes;
    using, by the computer processor, the plurality of clusters to determine a state and mode of the facility;
    determining, by the computer processor, when the facility is in a normal state, whether an event in the facility comprises an abnormality;
    transmitting, by the computer processor, a signal to a computer display device indicating the abnormality;
    regenerating, by the computer processor, the plurality of clusters when one or more new modes of the facility are identified;
    using, by the computer processor, the regenerated plurality of clusters to determine, when the facility is in a normal state, whether an event in the facility comprises an abnormality; and
    transmitting, by the computer processor, a signal to the computer display device indicating the abnormality;
    determining, by the computer processor and the plurality of clusters, when to commence a normal shutdown;
    transmitting, by the computer processor, a signal to the computer display device indicating when to commence the normal shutdown;
    wherein each of the plurality of clusters relates to a particular facility state and a particular facility operating mode; and
    wherein each of the plurality of clusters comprises descriptors relating to the particular facility state and the particular facility operating mode.

2. The process of claim 1, further comprising: estimating, by the computer processor, when the facility is in the normal state, using the clusters, future values of key performance indicators (KPIs), the future values of the key performance indicators (KPIs) providing real-time guidance to an operator of the facility, and evaluating, by the computer processor, on-the-job actions of the operator.

3. The process of claim 1, comprising;
    determining, by the computer processor, when the facility is in the normal state, using the plurality of clusters, whether the facility is in a steady state and an optimal operation mode; and
    in accordance with a determination that the facility is not in a steady state and optimal operation mode, determining, by the computer processor, one or more factors causing the facility to not be in the steady state and the optimal operation mode.

4. The process of claim 1, wherein determination of the state and the mode of the facility further comprises:
    receiving, by the computer processor, current facility data;
    processing, by the computer processor, the current facility data by comparing the current facility data to the clusters;

identifying, by the computer processor, one or more clusters of the plurality of clusters that are similar to the current facility data;

generating, by the computer processor, a subset of the plurality of clusters, the subset comprised of the identified similar clusters; and determining, by the computer processor, the state and mode of the facility based on the identified similar clusters.

5. The process of claim 1, wherein receiving the facility data comprises receiving at least one of: sensor data from historical facility data, human machine interface (HMI) graphics data, operation logs, and key performance indicator (KPI) data.

6. The process of claim 1, comprising:
determining, by the computer processor, whether the facility is going through a change in the state or the mode of the facility by examining values of key process indicators (KPIs) and correlation changes among the facility data; and transmitting, by the computer processor, a signal to the computer display device reporting the change in the state or the mode.

7. The process of claim 1, comprising:
examining, by the computer processor, the facility data in the plurality of clusters that are directly related to the event;

examining, by the computer processor, facility data in the plurality of clusters that are indirectly related to the event;

determining, by the computer processor, a course of action in response to the event as a function of the direct and indirect facility data; and transmitting, by the computer processor, a signal to an operator or a computer display device indicating the course of action.

8. The process of claim 1, comprising:
determining, by the computer processor and the plurality of clusters, when to commence an emergency shutdown; and transmitting, by the computer processor, a signal to the computer display device indicating when to commence the emergency shutdown.

9. The process of claim 1, comprising:
determining, by the computer processor and the plurality of clusters, whether a startup comprises a cold startup or a hot startup; and transmitting, by the computer processor, a signal to the computer display device indicating whether the startup comprises a cold startup or a hot startup.

10. The process of claim 1, comprising:
processing, by the computer processor, the facility data by dividing the facility data into subsets; and
by the computer processor, normalizing the facility data, cleaning the facility data, and filling in missing facility data.

11. The process of claim 1, wherein using the plurality of clusters to determine the state and the mode of the facility is based on one or more of a product type, a planned maintenance, a plant load, an environmental condition, a process constraint, and a state of a non-automated parameter.

12. A device comprising:
a computer processor;
memory; and
one or more programs stored in memory, the one or more programs including instructions for performing a process comprising:

receiving, by the computer processor, facility data relating to states of a facility and operating modes of the facility;

clustering, by the computer processor, the facility data into groups representing facility states and facility operating modes, thereby generating a plurality of clusters relating to the facility states and facility operating modes;

using, by the computer processor, the plurality of clusters to determine a state and mode of the facility;

determining, by the computer processor, when the facility is in a normal state, whether an event in the facility comprises an abnormality;

transmitting, by the computer processor, a signal to an operator or a computer display device indicating the abnormality;

determining, by the computer processor and the plurality of clusters, when to commence a normal shutdown; and transmitting, by the computer processor, a signal to the computer display device indicating when to commence the normal shut down;

wherein each of the plurality of clusters relates to a particular facility state and a particular facility operating mode; and wherein each of the plurality of clusters comprises descriptors relating to the particular facility state and the particular facility operating mode.

13. The device of claim 12, comprising: estimating, by the computer processor, when the facility is in the normal state, using the clusters, future values of key performance indicators (KPIs), the future values of the key performance indicators (KPIs) providing real-time guidance to an operator of the facility, and evaluating on-the-job actions of the operator.

14. The device of claim 12, comprising:
determining, by the computer processor, when the facility is in the normal state, using the plurality of clusters, whether the facility is in a steady state and an optimal operation mode; and in accordance with a determination that the facility is not in a steady state and optimal operation mode, determining, by the computer processor, one or more factors causing the facility to not be in the steady state and the optimal operation mode.

15. The device of claim 12, wherein determination of the state and the mode of the facility comprises:
receiving, by the computer processor, current facility data;

processing, by the computer processor, the current facility data by comparing the current facility data to the clusters;

identifying, by the computer processor, one or more clusters of the plurality of clusters that are similar to the current facility data;

generating, by the computer processor, a subset of the plurality of clusters, the subset comprised of the identified similar clusters; and determining, by the computer processor, the state and mode of the facility based on the identified similar clusters.

16. A non-transitory computer-readable storage medium comprising one or more programs for execution by one or more processors of a device, the one or more programs including instructions which, when executed by the one or more processors, cause the device to perform a process of:

assessing, by the one or more processors, facility data relating to states of a facility and operating modes of the facility;

processing, by the one or more processors, the facility data using a trained machine learning model, the trained machine learning model trained using historical facility data comprising a plurality of facility states and facility operating modes, to determine a state and mode of the facility;

using, by the one or more processors, the trained machine learning model to determine, when the facility is in a normal state, whether an event in the facility comprises an abnormality;

determining, using the trained machine model, when to commence an emergency shutdown; and transmitting, by the one or more processors, a signal to a computer display device indicating when to commence the emergency shutdown.

17. The non-transitory computer-readable medium of claim 16, comprising:

estimating, when the facility is in the normal state, using the clusters, future values of key performance indicators (KPIs), the future values of the key performance indicators (KPIs) providing real-time guidance to an operator of the facility, and evaluating on-the-job actions of the operator.

18. The non-transitory computer-readable medium of claim 16, comprising:

determining, when the facility is in the normal state, whether the facility is in a steady state and an optimal operation mode; and in accordance with a determination that the facility is not in a steady state and optimal operation mode, determining one or more factors causing the facility to not be in the steady state and the optimal operation mode.

* * * * *